United States Patent
Horikawa et al.

(10) Patent No.: US 9,803,261 B2
(45) Date of Patent: Oct. 31, 2017

(54) METHOD FOR IMPROVING QUALITY OF TITANIUM-CONTAINING FEEDSTOCK

(71) Applicant: TOHO TITANIUM CO., LTD., Chigasaki-shi, Kanagawa (JP)

(72) Inventors: Matsuhide Horikawa, Chigasaki (JP); Seiichiro Tani, Chigasaki (JP)

(73) Assignee: TOHO TITANIUM CO., LTD., Kanagawa (JP)

( * ) Notice: Subject to any disclaimer, the term of this patent is extended or adjusted under 35 U.S.C. 154(b) by 41 days.

(21) Appl. No.: 14/429,643

(22) PCT Filed: Mar. 6, 2014

(86) PCT No.: PCT/JP2014/055841
§ 371 (c)(1),
(2) Date: Mar. 19, 2015

(87) PCT Pub. No.: WO2014/136901
PCT Pub. Date: Sep. 12, 2014

(65) Prior Publication Data
US 2015/0368753 A1   Dec. 24, 2015

(30) Foreign Application Priority Data

Mar. 6, 2013 (JP) ................. 2013-044070
Mar. 19, 2013 (JP) ................. 2013-056697

(51) Int. Cl.
*C22B 34/00* (2006.01)
*C22B 34/12* (2006.01)
(Continued)

(52) U.S. Cl.
CPC .......... *C22B 34/1209* (2013.01); *C01B 7/035* (2013.01); *C01G 23/022* (2013.01);
(Continued)

(58) Field of Classification Search
CPC ............ C22B 34/1204; C22B 34/1209; C22B 34/1222; C22B 34/1227; C22B 1/08;
(Continued)

(56) References Cited

U.S. PATENT DOCUMENTS 3,950,489 A    4/1976  Fukushima
4,389,391 A *  6/1983  Dunn, Jr. ............. C01G 23/047
                                               423/149

FOREIGN PATENT DOCUMENTS

AU    242474 B      9/1960
EP    0232615 A2    8/1987
(Continued)

OTHER PUBLICATIONS

Ketteridge et al., "Chlorination of Ilmenite", Australian Journal Applied Science, vol. 15, No. 2, Jun. 2, 1964, p. 90-105.
(Continued)

*Primary Examiner* — Steven Bos
(74) *Attorney, Agent, or Firm* — Fitch, Even, Tabin & Flannery, LLP

(57) ABSTRACT

A technique is provided, in which impure metal is efficiently separated and removed from titanium-containing raw material such as titanium slag or ilmenite and high titanium-containing raw material is produced. The method for improving quality of titanium-containing raw material containing slag, including steps of: oxidizing the titanium-containing raw material, selectively chlorinating impurities in the titanium-containing raw material, and separating and removing the impure chlorides to obtain high titanium-containing raw material. Alternatively, in this method, the oxidizing treatment and the selective chlorinating treatment are performed simultaneously.

8 Claims, 2 Drawing Sheets

(51) Int. Cl.
*C01G 23/04* (2006.01)
*C22B 1/02* (2006.01)
*C22B 7/04* (2006.01)
*C22B 1/08* (2006.01)
*C01G 23/02* (2006.01)
*C01B 7/03* (2006.01)

(52) U.S. Cl.
CPC ............... *C01G 23/04* (2013.01); *C22B 1/02* (2013.01); *C22B 1/08* (2013.01); *C22B 7/04* (2013.01); *C22B 34/1204* (2013.01); *Y02P 10/212* (2015.11)

(58) Field of Classification Search
CPC ........ C22B 7/04; C01G 23/04; C01G 23/043; C01G 23/047; C01G 23/02; C01B 7/035
USPC .......... 423/69, 149, 481, 492, 500, 610, 632
See application file for complete search history.

(56) References Cited

FOREIGN PATENT DOCUMENTS

| | | |
|---|---|---|
| JP | S47-033905 A | 11/1972 |
| JP | 49-123918 A | 11/1974 |
| JP | 53-082613 A | 7/1978 |
| JP | 62-167223 A | 7/1987 |
| JP | 2004-083297 A | 3/2004 |

OTHER PUBLICATIONS

Office Action of JP Appln. No. 2013-044070 dated Apr. 12, 2016 with English translation.
International Search Report for International Application No. PCT/JP2014/055841 dated May 27, 2014.

\* cited by examiner

Preliminary oxidizing and selective chlorinating serial treatment

Oxidizing and roasting treatment

Simultaneous oxidizing and chlorinating treatment
(Preliminary oxidizing and selective chlorinating)

Oxidizing and roasting treatment

METHOD FOR IMPROVING QUALITY OF TITANIUM-CONTAINING FEEDSTOCK

TECHNICAL FIELD

The present invention relates to a method for improving the quality of titanium-containing raw material such as ilmenite ore or titanium slag, and, in particular, relates to a method in which a quality improving treatment is performed by a selective chlorinating method.

BACKGROUND ART

Titanium tetrachloride has been produced by a chlorinating reaction of titanium-containing raw material, and high titanium-containing raw material for production of titanium tetrachloride contains a few percent of impure oxides. Most of the impure oxides are chlorinated as similarly as titanium oxide, and since most of the impure chlorides have a high melting point, they are separated and recovered as a solid component, and treated as waste material.

Therefore, it is considered desirable to reduce chlorine loss during the chlorinating of titanium-containing raw material as the amount of impurities in titanium-containing raw material is smaller.

However, the amount of deposit of high grade titanium-containing raw material is limited, and there is a tendency that the price of the high titanium-containing raw material is increasing reflecting great demand recently in South-East Asia.

The high titanium-containing raw material is conventionally available in the market in the form of synthetic rutile in which a low-grade ilmenite ore as a starting material is improved in quality by a wet method such as the Benelite method.

On the other hand, a quality improving method is also known in which impurities in titanium-containing raw material are selectively chlorinated by chlorine gas so that the impurities are removed in the form of chlorides.

In the above selective chlorinating method, chlorine gas is reacted with titanium-containing raw material first, so that iron in the titanium-containing raw material is separated and removed in the form of chloride.

At this time, among oxides contained in the titanium-containing raw material, $Ti_3O_5$ or the like, which is one of titanium suboxides, has a tendency to be chlorinated at the same time of chlorinating of iron since it is easy to be chlorinated compared to titanium oxide ($TiO_2$). This is not desirable since it may cause loss of titanium and chlorine gas. This is a problem when the selective chlorinating method is used in quality improving in titanium-containing raw material.

The selective chlorinating method is known as a technique in which only the iron component in titanium-containing raw material is selectively chlorinated, separated and removed so that grade of titanium oxide in titanium-containing raw material is improved, as mentioned above. In particular, for example, Japanese Unexamined Patent Application Publication No. Showa 62 (1987)-167223 discloses a method in which ilmenite ore is preliminarily reduced before selective chlorinating of the ilmenite ore.

The publication discloses that, according to this method, the ratio of divalent iron in the ilmenite ore is increased, and as a result, the ratio of separating and removing of iron by the selective chlorinating can be increased.

However, in the above method, there may be a case in which a part of titanium oxide in ilmenite ore is reduced and titanium suboxide is generated. Titanium suboxide is easier to be chlorinated compared to titanium oxide, and, during selective chlorinating, there may be a case in which chlorinating of titanium suboxide is promoted in addition to chlorinating of iron oxide. When titanium suboxide is chlorinated, there is a new problem that the amount of titanium oxide in titanium ore is reduced.

Furthermore, since the selective chlorinating reaction of titanium ore is an endothermic reaction, the temperature around reaction part may be decreased and a certain reaction rate cannot be maintained unless heat is supplied from the outside. Since a further cost may be required to maintain the reaction temperature, there is room for improving in this problem.

As mentioned above, a technique is required in which selective chlorinating of ilmenite ore or titanium slag can be efficiently promoted.

SUMMARY OF THE INVENTION

The present invention relates to a quality improving method for titanium-containing raw material, and, in particular, an object of the invention is to provide a technique in which impure metals can be efficiently separated and removed from titanium-containing raw material such as titanium slag or ilmenite so as to produce high titanium-containing raw material.

The inventors researched means for solving the subject in view of the above circumstances, they found that loss of titanium oxide during selective chlorinating of titanium-containing raw material can be minimized and titanium ore can be efficiently improved in quality by oxidizing the titanium-containing raw material before the selective chlorinating of titanium ore, and the present invention was completed.

That is, the method for improving the quality of titanium-containing raw material containing slag (hereinafter simply referred to as "titanium-containing raw material") of the present invention includes an oxidizing step of the titanium-containing raw material, a selective chlorinating step of only the impurities in the titanium-containing raw material, and a separating and removing step of the impure chlorides to obtain high titanium-containing raw material.

Furthermore, the method for improving the quality of titanium-containing raw material of the present invention includes the step of oxidizing the titanium-containing raw material and the step of selective chlorinating impurities in the titanium-containing raw material performed simultaneously (hereinafter simply referred to as "simultaneous oxidizing and selective chlorinating"), and the step of separating and removing the impure chlorides to obtain high titanium-containing raw material.

In the method for improving the quality of titanium-containing raw material of the present invention, it is desirable that the reaction heat generated during the oxidizing process be used as a source of preliminary heating of titanium-containing raw material.

In the method for improving the quality of titanium-containing raw material of the present invention, it is desirable that titanium suboxide contained in the titanium-containing raw material be oxidized to be titanium oxide in the oxidizing process.

In the method for improving quality of titanium-containing raw material of the present invention, it is desirable that iron suboxide contained in the titanium-containing raw material be oxidized to be iron oxide in the oxidizing process.

In the method for improving quality of titanium-containing raw material of the present invention, it is desirable that titanium-containing raw material in which a content of impure components is reduced by the selective chlorinating be used as a raw material for production of titanium tetrachloride.

In the method for improving quality of titanium-containing raw material of the present invention, it is desirable that impure metal chlorides generated by the selective chlorinating are oxidizing-roasted so that the impure metal chlorides are converted to impure metal oxides, and, at the same time, a chlorine component contained in the impure metal chlorides is recovered in the form of chlorine gas.

In the method for improving quality of titanium-containing raw material of the present invention, it is desirable that the impure metal chlorides generated by the selective chlorinating be reduced by hydrogen gas so that the chlorine component contained in the impure metal chlorides is recovered in the form of hydrochloric acid.

In the method for improving quality of titanium-containing raw material of the present invention, it is desirable that the chlorine gas recovered be recycled as a chlorinating agent for raw material for production of titanium tetrachloride, the selective chlorinating process, and/or the simultaneous oxidizing and chlorinating process.

According to the method of the present invention, titanium oxide loss in the selective chlorinating reaction of titanium-containing raw material can be minimized, and at the same time, the selective chlorinating reaction of titanium ore can be efficiently promoted.

MODE FOR CARRYING OUT THE INVENTION

The preferred Embodiments of the present invention are further explained with reference to the drawings.

First Embodiment

Figure 1:
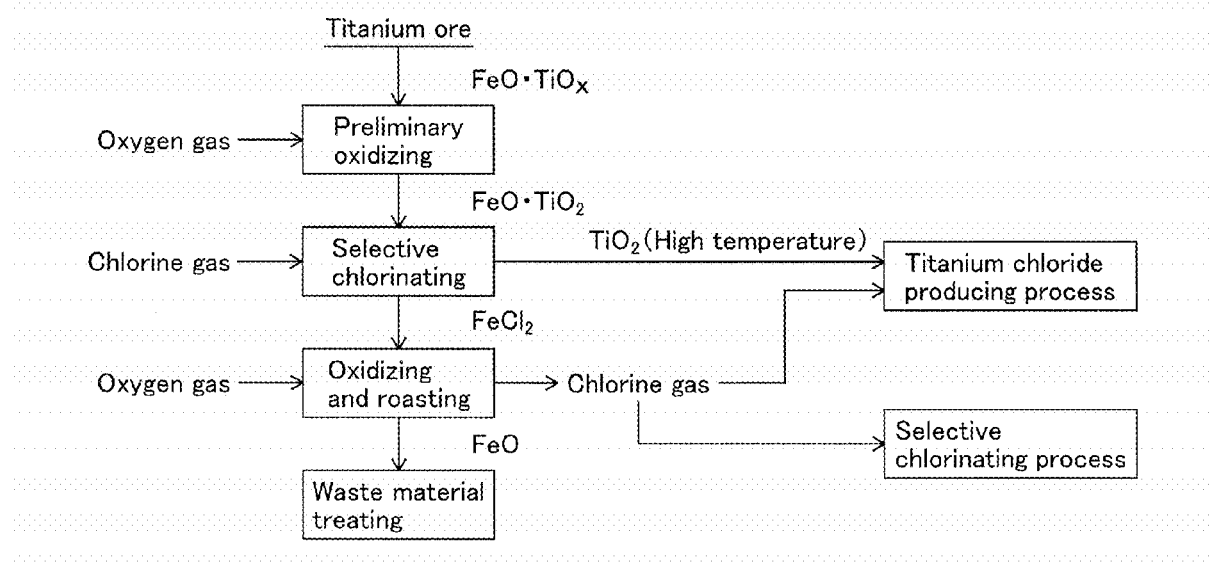
FIG. 1 is a flowchart diagram showing the first Embodiment of the present invention.
Figure 3:
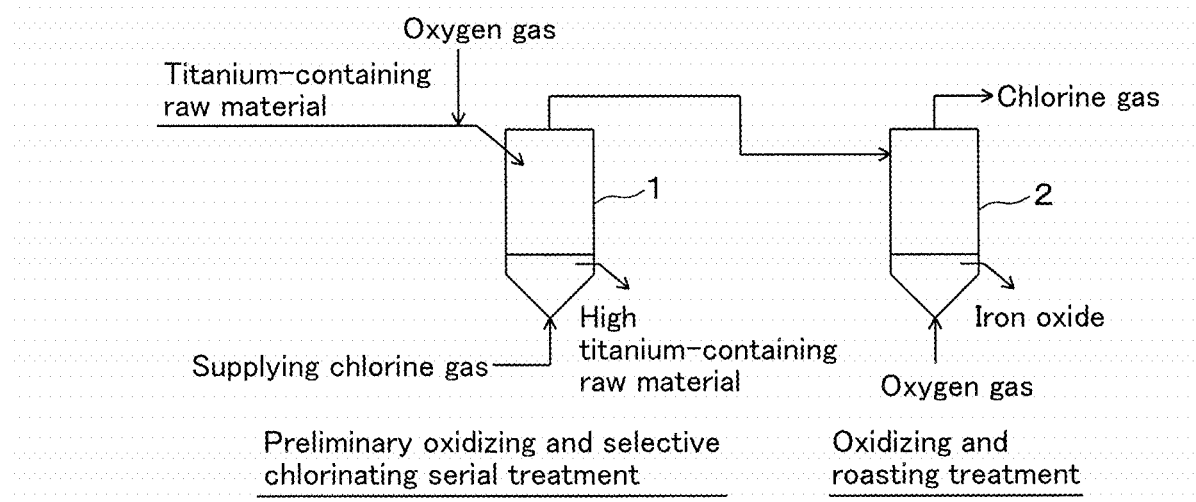
FIG. 3 is a conceptual diagram showing the first Embodiment of the present invention.

FIGS. 1 and 3 show the first Embodiment which is a preferred Embodiment of the present invention by the flowchart diagram and the conceptual diagram of processes, respectively. As the titanium-containing raw material containing slag of the present invention, a raw material containing a low amount of titanium oxide such as ilmenite or titanium slag can be desirably used. Alternatively, a mixture raw material in which titanium slag is added to high-grade titanium ore such as ilmenite or rutile can be desirably used as raw material of the present invention.

The present invention is characterized in that a preliminary oxidizing treatment of these titanium-containing raw materials is performed before selective chlorinating.

By performing the preliminary oxidizing treatment, titanium suboxide in titanium slag or ilmenite can be oxidized to titanium oxide. The "titanium suboxide" here means an oxide in which oxygen atom is short to titanium atom compared to $TiO_2$, such as $Ti_3O_5$, $Ti_2O_3$ or the like.

Titanium oxide is difficult to be chlorinated compared to titanium suboxide, and as a result, by converting titanium suboxide in the titanium-containing raw material into titanium oxide as much as possible before selective chlorinating, titanium loss in which titanium suboxide is removed in the form of titanium chloride in selective chlorinating, which is a next step, can be effectively reduced.

In addition, by performing the preliminary oxidizing treatment, iron suboxide in titanium slag or ilmenite can be oxidized to iron oxide ($Fe_2O_3$). The "iron suboxide" here means an oxide in which oxygen atom is short to iron atom compared to $Fe_2O_3$, such as $FeO$ or $Fe_3O_4$.

By performing the abovementioned oxidizing treatment, iron oxide contained in titanium slag or ilmenite can be efficiently converted into iron chloride in the selective chlorinating treatment, which is a next step, and as a result, the iron oxide can be efficiently separated and removed.

It is desirable that atmosphere in the preliminary oxidizing of titanium-containing raw material be an oxygen partial pressure atmosphere of 0.2 atm or more. By maintaining the oxygen partial pressure atmosphere in this range, titanium suboxide contained in ilmenite or titanium slag can be efficiently converted into titanium oxide.

Furthermore, the temperature in the oxidizing treatment of titanium-containing raw material can be in a range of 800° C. to 1200° C., and more desirably in a range of 900° C. to 1100° C.

By performing the oxidizing treatment in the above temperature range, titanium suboxide and iron suboxide in the titanium-containing raw material can be efficiently converted into titanium oxide and iron oxide, respectively.

In the present invention, the oxidizing treatment reaction of titanium-containing raw material is an exothermic reaction, it is desirable to supply the titanium-containing raw material as it is to the selective chlorinating furnace without cooling to room temperature.

By supplying the titanium-containing raw material as mentioned above, reaction heat which is generated in the oxidizing treatment of titanium-containing raw material can be efficiently used, and as a result, the reaction temperature during the selective chlorinating can be efficiently prevented from being decreased.

In the present invention, by contacting ilmenite or titanium slag, which is preliminarily oxidized as mentioned above to chlorine gas at a high temperature, iron oxide in the titanium-containing raw material can be separated and removed as iron chloride.

It is desirable that carbon material such as coke not be used together in the selective chlorinating of the present invention.

This is because, if carbon material is used in the selective chlorinating, carbon dioxide and carbon monoxide gases may be generated in addition to iron chloride during the selective chlorinating, and as a result, oxidizing roasting rate of the iron chloride generated may be undesirably decreased.

It is desirable that the temperature of the selective chlorinating of titanium-containing raw material be set in a range of 600° C. to 1200° C. By setting in the range of temperature in the selective chlorinating, the selective chlorinating reaction can be efficiently promoted.

In a case in which the temperature of the selective chlorinating of titanium-containing raw material is above 1200° C., equilibrium between titanium-containing raw material plus chlorine gas (left member) and iron chloride (right member) has a tendency to move to the right side. Therefore, it is considered desirable for the temperature to be higher from the viewpoint of equilibrium; however, the porosity of ilmenite and titanium slag may become smaller, and reactivity with chlorine may be deteriorated. Furthermore, sintering of raw material held in a fluidized layer may be promoted and it may become difficult to maintain stable selective chlorinating reaction.

Therefore, in the present invention, it is desirable that temperature of the selective chlorinating be in a range of 600° C. to 1200° C.

On the other hand, in a case in which the temperature of the selective chlorinating of titanium-containing raw material is below 600° C., equilibrium between titanium-containing raw material plus chlorine gas and iron chloride may move to the left side, and this is not practical from the viewpoint of equilibrium.

Second Embodiment

Figure 2:
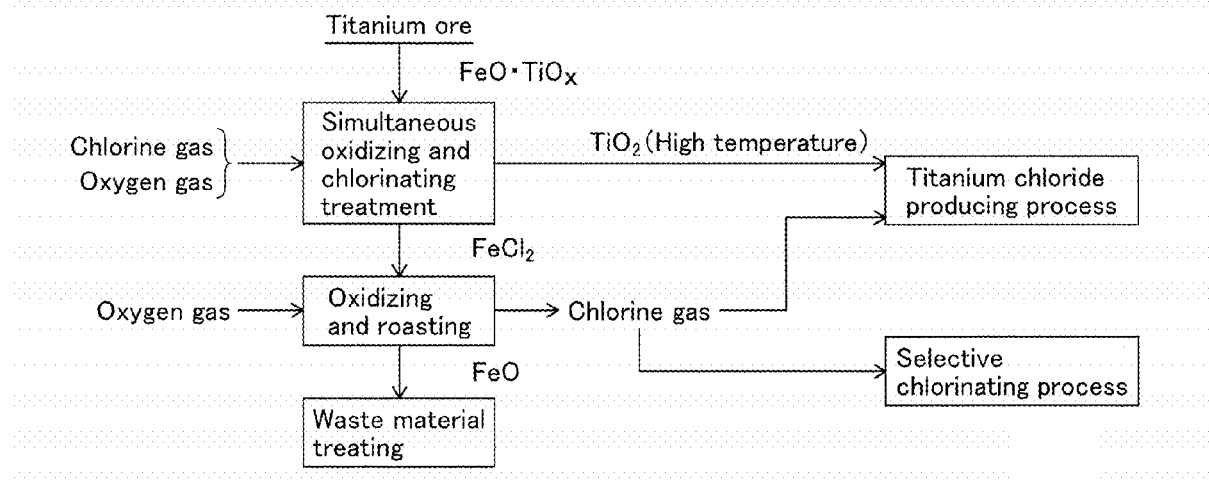
FIG. 2 is a flowchart diagram showing the second Embodiment of the present invention.
Figure 4:
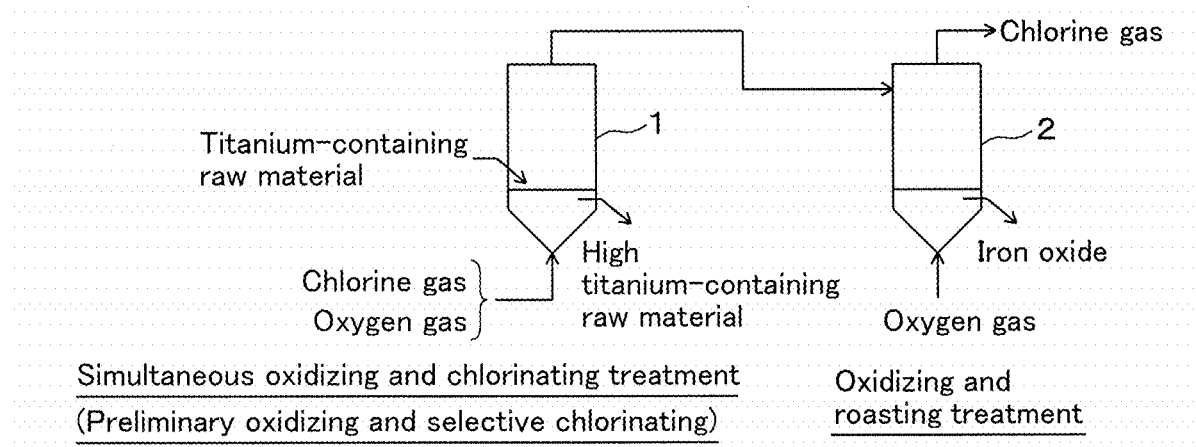
FIG. 4 is a conceptual diagram showing the second Embodiment of the present invention.

FIGS. 2 and 4 show the second Embodiment of the present invention by the flowchart diagram and the conceptual diagram of processes, respectively. The preliminary oxidizing treatment and chlorinating treatment of titanium-containing raw material are serially performed in the first Embodiment of the quality improving method of titanium-containing raw material in which impurities are separated and removed from titanium-containing raw material, and on the other hand, in the second Embodiment, it is characterized in that these treatments are simultaneously performed (hereinafter simply referred to as "simultaneous oxidizing and chlorinating treatment).

By the simultaneous method, reaction heat which is generated in the preliminary oxidizing treatment of titanium-containing raw material can be efficiently used for compensating heat shortage by an endothermic reaction accompanied by oxidizing roasting treatment reaction, which is a next step.

In this Embodiment, it is desirable that oxygen gas and chlorine gas are supplied from the bottom part of the reaction device in which simultaneous oxidizing and chlorinating treatment is performed.

By supplying the reaction gas in this way, the simultaneous oxidizing and chlorinating treatment can be efficiently promoted.

Processes Common in the First and Second Embodiments

In the present invention, it is desirable that iron chloride by-produced in the selective chlorinating reaction in the first Embodiment or in the simultaneous oxidizing and chlorinating treatment in the second Embodiment be then contacted to oxygen gas at high temperature in an oxidizing roasting process. By contacting in this way, iron chloride generated in the selective chlorinating of titanium-containing raw material can be resolved into iron oxide ($Fe_2O_3$) and chlorine gas.

Chlorine gas byproduced in the above reaction can be used as a chlorinating agent for the selective chlorinating or a chlorinating of titanium tetrachloride in the present invention.

It is understood that the abovementioned $Fe_2O_3$ can be used as a magnetic material or painting material.

In the present invention, impure metal chlorides generated in the selective chlorinating process or the simultaneous oxidizing and chlorinating treatment process are reduced by hydrogen gas so that chlorine in the impure metal chlorides can be recovered in the form of hydrochloric acid.

The hydrochloric acid gas recovered is made to an aqueous solution and electrolyzed, so that chlorine gas and hydrogen gas can be recovered.

In the present invention, impure metal chlorides generated in the selective chlorinating process or simultaneous oxidizing and chlorinating treatment process are reduced by titanium metal, so that chlorine in the impure metal chlorides can be recovered in the form of titanium chloride.

The titanium chloride recovered can be separated and recovered into chlorine gas and titanium metal by molten salt electrolysis.

Furthermore, titanium chloride recovered is reduced by a metal of a reducing agent, so that titanium metal can be recovered. In addition, the reducing agent metal may be chloride of the reducing agent metal, this can be recovered as chlorine gas and the reducing agent metal by molten salt electrolysis.

As the reducing agent metal, for example, magnesium metal, calcium metal, or sodium metal can be used.

In the present invention, metal chloride which did not react in the oxidizing roasting reaction, reduction by hydrogen gas or reduction by titanium metal is again returned to each of the abovementioned treatment process, so that the reaction ratio of the impure metal chloride can be effectively increased.

The quality of titanium oxide in remaining titanium ore from which impure metal is separated and removed as chlorides by the selective chlorinating reaction or simultaneous oxidizing and chlorinating treatment of the titanium ore, is improved compared to original ore; therefore, it can be preferably used as a raw material for production of titanium tetrachloride as it is.

According to the abovementioned methods, not only can titanium ore having low grade of titanium oxide be improved in quality efficiently, but also impure metal chloride byproduced in the quality improving reaction can be effectively recycled as a valuable material by performing oxidizing roasting or reduction treatment.

EXAMPLES

Hereinafter the present invention is further explained in detail with reference to Examples and Comparative Example.

Common conditions in Examples and Comparative Example, conditions of serial preliminary oxidizing and selective chlorinating treatment, and conditions of simultaneous treatment are as follows.

1. Raw Material (Common)
   1) Titanium-containing raw material (titanium slag, chemical compositions are shown in Table 1, particle size: 100 to 500 μm)
   2) Oxygen gas (purity: 99.99%, formation: bottled gas)
2. Conditions of Preliminary Oxidizing (Serial Treatment)
   1) Temperature: 800 to 1200° C.
   2) Atmosphere: oxidizing (pure oxygen)
3. Conditions of Selective Chlorinating (Serial Treatment)
   1) Temperature: 600 to 1200° C.
   2) Atmosphere: chlorine gas
4. Conditions of Simultaneous Oxidizing and Chlorinating (Simultaneous Treatment)
   1) Temperature: 800 to 1200° C.
   2) Atmosphere: oxygen gas and chlorine gas were supplied separately
5. Conditions of Oxidizing Roasting (Common)
   1) Temperature: 400 to 1000° C.
   2) Atmosphere: oxidizing (pure oxygen)

6. Conditions of Hydrogen Reduction (Common)
   1) Temperature: 400 to 1000° C.
   2) Atmosphere: hydrogen
7. Conditions of Titanium Reduction (Common)
   1) Temperature: 400 to 1000° C.
   2) Atmosphere: inert gas Example 1-1 (FIGS. 1 and 3)

According to the flowchart shown in FIG. 1 and the above conditions, the quality improving treatment of titanium slag was performed by selective chlorinating and oxidizing roasting of titanium slag. The quality of titanium slag after the quality improving treatment was analyzed and the main analyzed values are shown in Table 1. As shown in Table 1, the grade of titanium oxide in titanium slag was improved greatly.

Furthermore, in the selective chlorinating, the reaction could be maintained without compensating heat, in particular, after heating the reaction furnace to the reaction temperature range.

Furthermore, titanium loss during the selective chlorinating was reduced to 3%, and it was an acceptable level in practice.

Comparative Example 1

The quality improving treatment of titanium slag was performed in a condition similar to that of Example 1-1, except that preliminary oxidizing before selective chlorinating of titanium slag was not performed. Analyzed values of titanium slag after the quality improving treatment are shown in Table 1. As shown in Table 1, the grade of titanium oxide in titanium slag was greatly improved. However, titanium loss in the selective chlorinating was 10%, which was worse than in Example 1-1.

Furthermore, it was necessary to maintain the reaction temperature by continuing outer heating, even after starting of the reaction in the selective chlorinating.

Example 1-2

In Example 1-1, impure metal chlorides generated in the selective chlorinating of titanium slag were reduced by hydrogen under the abovementioned conditions so that chlorine in the impure metal chlorides was recovered in the form of hydrochloric acid. Hydrochloric acid recovered was made to an aqueous solution, and this is electrolyzed so as to resolve into chlorine gas and hydrogen gas.

In a case in which chlorine in hydrochloric acid electrolyzed is assumed 100, ratio of chlorine recovered by the electrolysis was 80%.

Example 2 (FIGS. 2 and 4)

According to the flowchart shown in FIG. 2 and the above conditions, the quality improving treatment of titanium slag was performed by simultaneous oxidizing and chlorinating treatment of titanium slag. The quality of titanium slag after the quality improving treatment was analyzed, and the result is shown in Table 1. The grade of titanium oxide in the titanium slag was greatly improved.

Furthermore, in the selective chlorinating, the reaction could be maintained without compensating heat, in particular, after heating the reaction furnace to the reaction temperature range.

Furthermore, titanium loss by chlorinating of titanium suboxide during the selective chlorinating was reduced to 0.5%, which was an acceptable level in practice.

Furthermore, compared to the case of treatment flow in Example 1 (FIG. 1), since the construction of devices was simpler, raw material treatment cost was reduced 20%.

TABLE 1

Unit: wt %

| | Content ratio | | | | Ti loss (converted to TiO) | Outer heating |
|---|---|---|---|---|---|---|
| | $TiO_2$ | $Ti_3O_5$ | FeO | $Fe_2O_3$ | | |
| Raw material ore | 37 | 50 | 5 | 3 | — | — |
| Example 1 | 95 | 0 | 0 | 0 | 3.0 | Not necessary |
| Example 2 | 95 | 0 | 0 | 0 | 0.5 | Not necessary |
| C. Example 1 | 95 | 0 | 0 | 0 | 10 | Necessary |

According to the present invention, the quality improving treatment of titanium-containing raw material can be efficiently promoted.

The invention claimed is:

1. A method for improving quality of titanium-containing raw material containing slag, comprising steps of:
   an oxidizing step in which the titanium-containing raw material is oxidized,
   a selective chlorinating step in which impure metal components contained in the titanium-containing raw material are selectively chlorinated to form impure metal chlorides, wherein the oxidizing step and the selective chlorinating step are performed simultaneously, and
   a separating and removing step in which the impure metal chlorides are separated and removed to obtain high titanium-containing raw material,
   wherein carbon material is not used in the oxidizing step and the selective chlorinating step.

2. The method for improving quality of titanium-containing raw material according to claim 1, wherein reaction heat generated during the oxidizing step is used as a source of preliminary heating.

3. The method for improving quality of titanium-containing raw material according to claim 1, wherein titanium suboxide contained in the titanium-containing raw material is oxidized to be titanium oxide in the oxidizing step.

4. The method for improving quality of titanium-containing raw material according to claim 1, wherein iron suboxide contained in the titanium-containing raw material is oxidized to be iron oxide in the oxidizing step.

5. The method for improving quality of titanium-containing raw material according to claim 1, wherein titanium-containing raw material in which content of impure components is reduced by the selective chlorinating step is used as a raw material for production of titanium tetrachloride.

6. The method for improving quality of titanium-containing raw material according to claim 1, wherein impure metal chlorides generated by the selective chlorinating step is oxidizing-roasted so that the impure metal chlorides are converted to impure metal oxides, and at the same time, chlorine component contained in the impure metal chlorides is recovered in the form of chlorine gas.

7. The method for improving quality of titanium-containing raw material according to claim 1, wherein the impure metal chlorides generated by the selective chlorinating step is reduced by hydrogen gas so that chlorine component contained in the impure metal chlorides is recovered in the form of hydrochloric acid.

8. The method for improving quality of titanium-containing raw material according to claim 6, wherein the chlorine gas recovered is recycled as a chlorinating agent for the titanium-containing raw material and/or the oxidizing step and selective chlorinating step which are performed simultaneously.

* * * * *